United States Patent [19]
Johansson

[11] 3,971,462
[45] July 27, 1976

[54] CENTRIFUGAL CLUTCH WITH ENGAGING AND RELEASING WEIGHTS

[76] Inventor: Rolf Anders Gunnar Johansson, Vare, S-310 83 Unnaryd, Sweden

[22] Filed: Jan. 3, 1974

[21] Appl. No.: 430,592

[30] Foreign Application Priority Data
Jan. 12, 1973 Sweden............................ 7300425

[52] U.S. Cl. .................. 192/105 BA; 192/105 CE; 192/103 B; 192/26; 192/17 R
[51] Int. Cl.² ........................................ F16D 43/14
[58] Field of Search............ 192/103 B, 26, 105 CE, 192/114 R, 105 A, 105 BB, 104 B, 17 R; 30/381–387

[56] References Cited
UNITED STATES PATENTS

| | | | |
|---|---|---|---|
| 3,159,257 | 12/1964 | Bochan............................ | 192/114 X |
| 3,199,649 | 8/1965 | Bochan et al.................... | 192/114 X |
| 3,258,095 | 6/1966 | Shelton ........................... | 192/103 B |
| 3,324,984 | 6/1967 | Brame............................. | 192/114 X |
| 3,804,222 | 4/1974 | Reams............................. | 192/103 B |

*Primary Examiner*—Benjamin W. Wyche
*Attorney, Agent, or Firm*—Pierce, Scheffler & Parker

[57] ABSTRACT

A safety release arrangement for a centrifugal clutch having clutch shoes moving radially outwards under centrifugal force to engage a clutch drum. Each clutch shoe is divided into two mutually radially movable parts which during normal operation are locked together by a locking member and move as a unit. When the locking member is actuated by a safety release device the radially inward lying primary clutch shoe part is released with respect to the radially outward lying drum-engaging secondary clutch shoe part and can move radially outwards. By various arrangement the primary shoe is caused to draw the secondary clutch shoe radially inwards out of engagement with the clutch drum.

21 Claims, 9 Drawing Figures

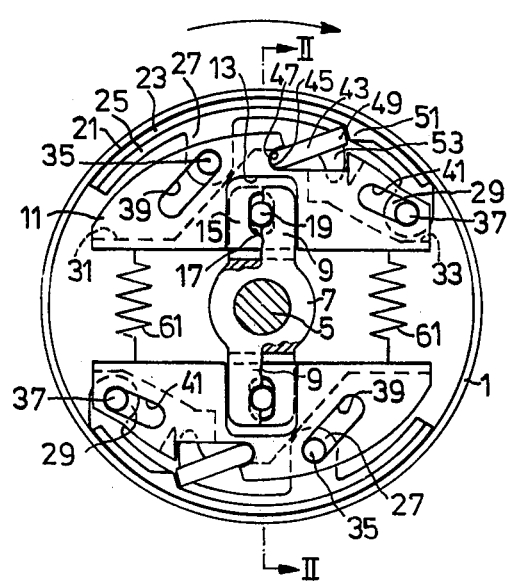
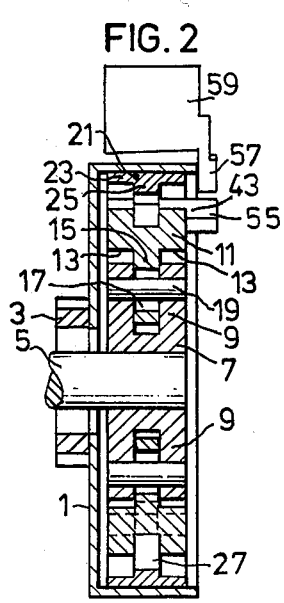
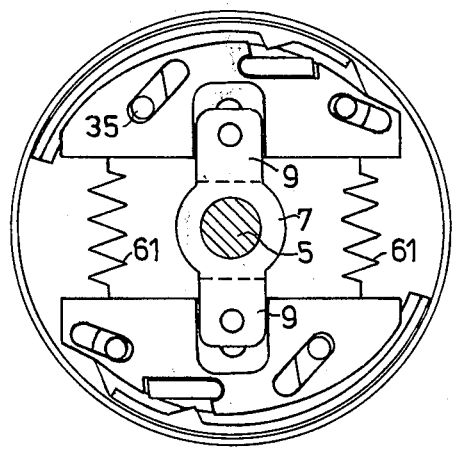

CENTRIFUGAL CLUTCH WITH ENGAGING AND RELEASING WEIGHTS

The present invention relates to an arrangement for a centrifugal clutch which comprises a clutch shoe center attached to a driving shaft, and clutch shoes which under the effect of centrifugal force are brought into engagement with a clutch drum.

The purpose of the invention is to design such a centrifugal clutch so that it can be arbitrarily disengaged independent of the revolutions per minute (rpm). The invention relates chiefly to obtaining a safety disengagement of the centrifugal clutch so that the power transmission can be immediately interrupted at any given moment. Such a safety disengagement arrangement is, for example, desirable in a power chain saw in order to disengage the chain from the motor upon actuation of a safety release means. The centrifugal clutch which is provided with disengagement can, suitably, also be used to make starting and warming up of the motor possible without the centrifugal clutch actually working.

A further purpose of the invention is to lessen the risk for the centrifugal clutch bursting, that is, the risk that the clutch drum, during over-speeding or due to material defects, bursts, so that the drum and the clutch shoes are thrown outwards.

According to the invention, this is achieved in the above-defined centrifugal clutch arrangement in that each clutch shoe is divided into a radial inner primary shoe which is driven by the clutch shoe center and a radial outer secondary shoe which is radially movable in relation to the primary shoe; that the primary shoe is, against the effect of a spring and under the effect of centrifugal force, movable from a radial inner release position to an outer position which is determined by stopping means which are connected to the clutch center; that a releasable locking means is arranged between the primary shoe and the secondary shoe and which, in the locking position locks the secondary shoe to the primary shoe in a radial outer working position as seen in relation to said primary shoe, and in which the secondary shoe, under the influence of the centrifugal force acting on the primary shoe, can be pressed against the clutch drum; and that the locking means can be actuated to a position which releases the shoes, in which position the shoes are allowed to move mutually radially, the radial dimension of the secondary shoe being less than the distance between the primary shoe in its outer position and the clutch drum, said distance being measured at the secondary shoe, whereby, when the locking means and the secondary shoe are released, the centrifugal force acting on the primary shoe is taken up by the clutch center while the secondary shoe lies free from the clutch drum or is pressed against said drum with, at most, only the centrifugal force acting on the secondary shoe.

Further advantages and properties of the invention are revealed by the claims and the following description of some embodiments of the invention. Reference is made to the accompanying drawings in which;

FIG. 1 shows a centrifugal clutch having a disengagement arrangement according to a first embodiment of the invention as seen axially and in operating position;

FIG. 2 shows a section along the line II—II in FIG. 1;

FIG. 3 shows the arrangement according to FIG. 1 in disengaged position during operation;

Figure 4:
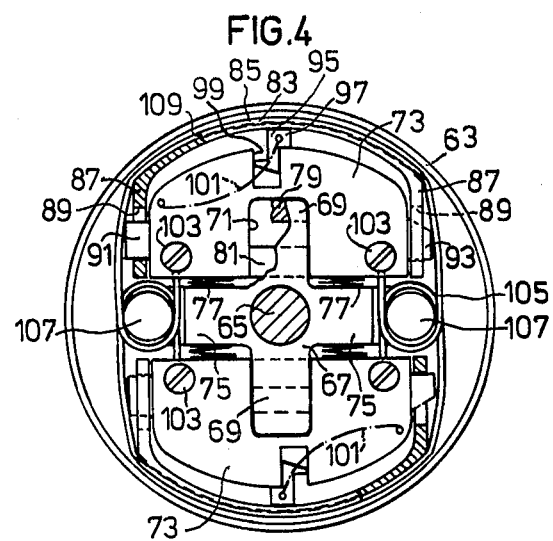
FIGS. 4 and 5 show a centrifugal clutch having another embodiment of the disengagement arrangement according to the invention, seen axially and with the clutch in rest position and disengaged position during operation, respectively.
Figure 5:
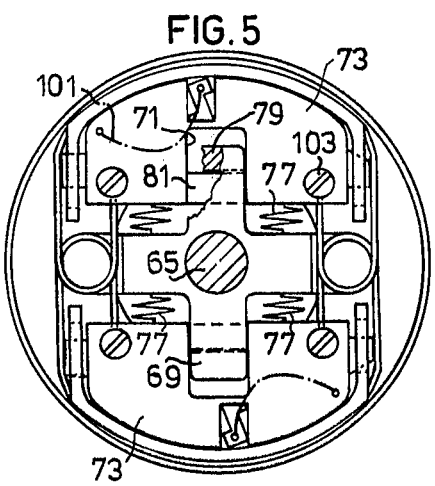
Figure 6:
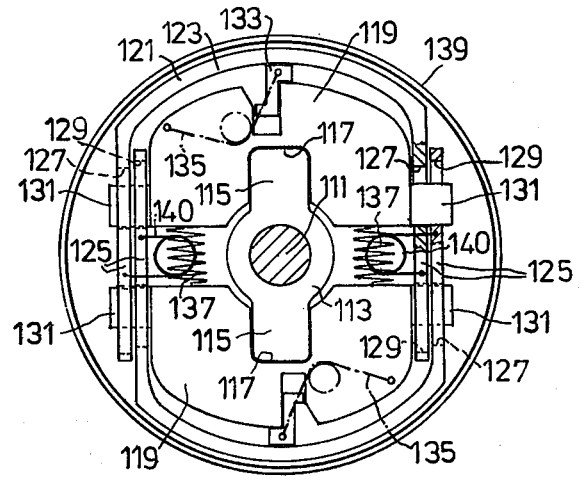
Figure 7:
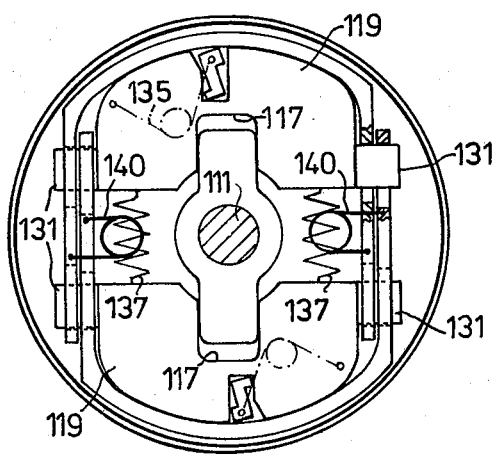
Figure 8:
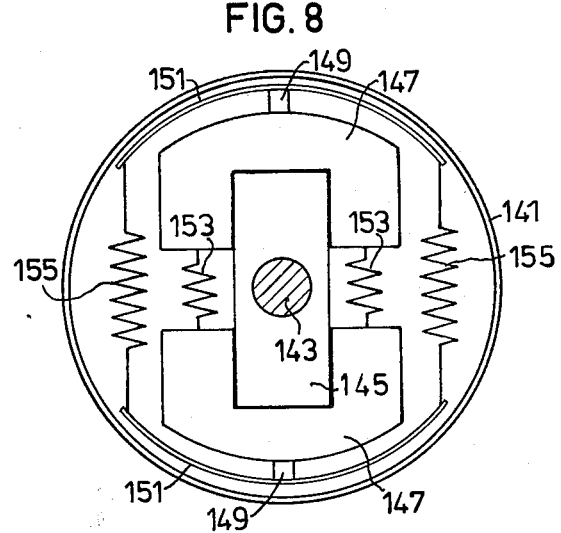
Figure 9:
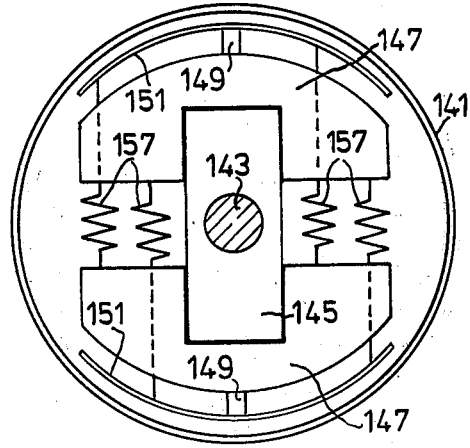

FIGS. 6 and 7, in a manner similar to FIGS. 4 and 5, show a third embodiment of the disengagement arrangement according to the invention in rest position and disengaged position during operation, respectively, and FIGS. 8 and 9 show two further embodiments of the invention, schematically illustrated in rest position.

The centrifugal clutch shown in FIGS. 1–3 comprises a clutch drum 1 which is rotatably mounted in a manner not shown here and provided with a sprocket 3 for driving a saw chain in a power saw. The motor shaft 5 of the saw extends into the drum 1 and, inside said drum, supports a clutch shoe center 7 having two diametrically arranged radial arms 9. An inner clutch shoe or primary shoe 11 is radially arranged on each arm 9 in such a manner as to be movable by means of a recess 13 provided on both sides of the primary shoe 11, a fork-shaped end of the arm 9 meshing with both of said recesses. A slot 17 is provided in the rib 15 remaining between the recesses 13 in the primary shoe 11, a pin 19 extending through said slot 17, the ends of said pin being attached to the arm fork shanks grasping the rib 15. When the clutch rotates, the primary shoe 11 can never move radially outwards past an outer end position in which the inner end of the slot 17 lies against the pin 19.

An outer clutch shoe or secondary shoe 21 is movably connected to the primary shoe 11. The secondary shoe 21 comprises a circle-arc-shaped friction member 23 arranged to press against the inside of the clutch drum 1 in order to transfer torque to the drum 1. The arc-shaped friction member 23 is supported by a centrally arranged rib 25 which has two extensions 27,29 which are essentially directed towards the motor shaft 5. The extensions project into two centrally situated recesses 31 and 33, respectively, in the primary shoe 11 and each extension is provided with a separate fixedly mounted axial pin 35 and 37, respectively, said pins running in slots 39 and 41, respectively, said slots being provided in the side walls of the primary shoe 11 defining the recesses 31 and 33, respectively. The slots are arranged at such an inclination that when the secondary shoe 21 moves from the radial outer position in which it is engaged with the clutch drum 1 as shown in FIG. 1 to the radial inner position shown in FIG. 3, it will also move counter-clockwise around the shaft 5, that is, in the opposite direction to the clockwise rotation of the centrifugal clutch.

In the operating position shown in FIG. 1, the secondary shoe 21 and the primary shoe 11 are held separated by means of a locking means 43, the inner rounded end 45 of which is pivotably mounted in a recess 47 in the primary shoe 11. The outer end 49 of the locking means 43 is cut flat and positioned to come into contact with and lie against a locking boss 51 in the friction member 23 of the secondary shoe 21 next to the rib 25. For the sake of symmetry, the secondary shoe 21 can be provided with a similar locking boss 51 on both sides of the rib 25, whereby the end 49 of the locking means 43 has a central recess for the rib 25. The locking means 43 is, furthermore, provided with a guiding boss 53 which engages the recess 33 in the primary shoe 11, thereby preventing the locking means 43 from moving axially.

As can be seen by FIG. 2, the locking means 43 extends axially outside of the clutch drum 1 with a member 55 which is positioned to be radially actuated for disengagement of the centrifugal clutch. According to FIG. 2, the actuation of the locking means member 55 takes place by means of a releasing boss 57 in a brake pad 59, said releasing boss preferably being shaped as a curve. The brake pad 59 can, in a known manner, be radially moved against the clutch drum 1 so as to brake the same.

When the centrifugal clutch is in a position of rest, both of its primary shoes 11 are held drawn into their resting position closest to the shaft by means of two draw springs 61 which are stretched between the sides of the shoes 11 which are facing each other. If the locking means 43 is actuated by the releasing boss 57 and releases the locking boss 51 of the secondary shoe 21, the locking means 43 falls into the collapsed position shown in FIG. 3. When the motor is started, the secondary shoe 21 will, during low rotational speeds, move outwards to its radially outermost position in relation to the primary shoe 11. This movement can take place due to the secondary shoe 21 not being affected by any draw spring or the like. When the secondary shoe 21 has assumed its outermost position in relation to the primary shoe 11 with its pins 35,37 in contact against the outer ends of the slots 39,41, the locking means 43 can also swing out to engage with the locking boss 57 by means of the influence of centrifugal force. When the speed is increased, the primary shoes 11 will also move radially outwards against the effect of the draw springs 61. At a speed corresponding to the engagement speed of the centrifugal clutch, the movable primary and secondary shoes, as a unit, have moved so far outwards radially that the friction member 23 of the secondary shoe 21 will come into contact with the clutch drum 1 and transfer torque. This position is shown in FIG. 1.

Disengagement of the centrifugal clutch can now be carried out arbitrarily and independent of the speed. The releasing boss 57 is brought radially inwards into the path of movement of the locking means 43 so that the boss 57 comes into contact with its member 55. The locking means 43 is therewith pivoted inwards around its inner end 45 and releases the locking boss 51 of the secondary shoe 21. The secondary shoe 21 can now move radially inwards and, at the same time, counterclockwise in relation the primary shoe 11. The radial outward movement of the primary shoe 11 is no longer prevented by the secondary shoe and, thus, the primary shoe 11 can now move radially outwards until the end of its slot 17 comes into contact against the pin 19 in the clutch center arm 9. The position shown in FIG. 3 has, herewith, been achieved. The secondary shoe 21 can still drag lightly against the inside of the clutch drum 1 but the contact force is slight, partly due to the fact that the secondary shoe has much less mass than the primary shoe 11 and partly because only a portion of the centrifugal force which is dependent on the inclination of the slots 39,41 can radially affect the secondary shoe 21. The torque that can be transferred to the clutch drum 1 in this disengagement position is very slight.

When the centrifugal clutch shall be engaged again after the disengagement described above, only the speed of the motor shaft has to be decreased so as to be lower than the engagement of the centrifugal clutch, after which the engagement procedure described above is repeated.

Even the slight torque which can be transferred to the clutch drum when disengagement has taken place can be avoided by the embodiment shown in FIGS. 4 and 5. The clutch according to FIGS. 4 and 5 comprises a clutch drum 63 and a clutch center 67 attached to the motor shaft 65, said clutch center having the form of a cross in which two diametrically opposing radial arms 69 are guided in their respective recesses 71 in the two primary shoes 73. The primary shoes 73 are held in the radial inner position of rest shown in FIG. 4 by means of the effect of draw springs 77 which are stretched between the transverse arms 75 of the clutch center 67 and the primary shoes 73. The radial outward motion of the primary shoe 73 is limited in this embodiment with the help of interacting locking bosses in the primary shoe and the arm 69 of the clutch center, the arm 69 having a stopping boss 79 situated on the outermost end of said arm (stopping boss 79 is illustrated by diagonal lines in the drawing) said stopping boss 79, in the outermost radial position of the primary shoe 73, coming into contact with a ridge 81 arranged in the opening of the recess 71 of the primary shoe 73. The position of said ridge 81, when in contact with the stopping boss 79, is shown in FIG. 5.

An outer clutch or secondary shoe 83 is arranged outside of the primary shoe 73, said secondary shoe having a circle-arc-shaped friction member 85, the ends of which continue into mutually parallel extending shanks 87. Extended guiding slots 89 are arranged in the shanks 87, said slots 89 being guided by guiding bosses 91 and 93 respectively, arranged one on each side of the primary shoe 73. The guiding boss 91 is formed by the head of a screw which has been screwed into the primary shoe 73.

A locking means 95 is arranged to, in the locking position, hold the primary shoe 73 and the secondary shoe 83 separated in the position shown in FIG. 4. For this purpose, the locking means has a locking shoulder 97 which is arranged to rest on the outside of the primary shoe 73 and, with its opposite side, lie in contact against the inside of the secondary shoe 83. The locking means 95 extends into a recess 99 in the primary shoe 73 and, in the disengagement position, lies in the recess 99 also with its locking shoulder 97; see FIG. 5. As in the example described in connection with FIGS. 1–3, the locking means 95 moves axially outside of the clutch drum 63 and, by means of a releasing means can be conveyed against the direction of rotation and radially inwards from the position shown in FIG. 4 to the one shown in FIG. 5. A wire spring 101 is stretched in between the primary shoe 73 and the locking means 95 in order to return the locking means 95 back to its locking position.

The edge of the primary shoe 73 which is turned towards the clutch center 67 is provided with two fastening screws 103 for the two ends of a line 105 which extends around a pair of axial pins 107 mounted on the ends of the cross arms 75 and which, from these, extends up over the secondary shoe 83 so that the line lies in a groove 109 arranged in the friction member 85. In the position of rest of the clutch shown in FIG. 4, the line 105 is not stretched. When the motor is started and its speed increases to the engagement speed of the centrifugal clutch, the primary and secondary shoes 73,83 which are coupled together by the locking means 95, move outwards as a unit against the effect of the springs 77 until the friction member 85 of the secondary shoe comes into contact against the clutch drum 63 and transfers torque. In this engagement position, the line 105 has taken on a stretched or essentially stretched position around the pins 107. If the locking means 95 is now released at a speed greater than the engagement speed of the centrifugal clutch, the primary shoe 73 will be able to move radially outwards, whereby the locking means 95 will move down into the recess 99. When the primary shoe 73 moves radially outwards, it will, by means of the line 105, pull the secondary shoe 83, which has a much smaller mass, radially inwards so that its friction member 85 will be at a distance from the clutch drum 63. The centrifugal clutch is, thus, totally disengaged and does not transfer any torque.

By means of the spring 101, the locking means 95 will be brought back to a locking position as soon as the motor speed is lowered below the engagement speed of the centrifugal clutch. Also in this embodiment, the primary shoes as well as the secondary shoes are prevented from leaving the clutch shoe center. Rather, they are held in the center by means of the stopping bosses 79 and the ridges 81, by means of which the shoes 73,83 are not thrown outwards in the event of the clutch drum 63 bursting.

FIGS. 6 and 7 show a third embodiment of the invention which also provides for total disengagement. In this embodiment, the motor shaft 111 supports a clutch shoe center 113 having two diametrically opposing radial arms 115 upon which run recesses 117 in both of the inner clutch shoes or primary shoes 119 of the clutch. Also in this embodiment, the radial outward movement of the primary shoes 119 is restricted by means of the clutch center 113, for example by the same arrangement as described in connection with FIGS. 4 and 5.

Secondary shoes 121, constructed with less mass, are arranged outside of the primary shoes 119, said secondary shoes 121 each having a circle-arc-shaped friction member 123 having mutually parallel shanks 125 extending from the ends of the friction member. The shanks 125 are extended past the motor shaft 111 and extend along the sides of the associated as well as the opposite primary shoe 119. A slot 127 is arranged in each of the shanks 125 near the friction member 123 and a longer slot 129 near the free end of the shank. The slots 127,129 are guided on guiding bosses 131 in the sides of the primary shoes 119. The guiding bosses 131 can be screws which are screwed into the primary shoes 119.

FIG. 6 shows the clutch in a position of rest. The secondary shoes 121 are held separated from their primary shoes 119 by means of a locking means 133 corresponding to the locking means 95 in the embodiment according to FIGS. 4 and 5. The locking means 133 is held in position by means of a wire spring 135. The primary shoes 119 are held pulled towards each other by means of draw springs 137. The guiding pins 131 of each primary shoe 119 interact herewith with the slot 127 in the shanks 125 of the associated secondary shoe 121 at the slot end facing away from the friction member 123, and hold the secondary shoe in a radial inner position in which the friction member 123 lies at a distance from the clutch drum 139. If the speed of the motor shaft 111 is now increased to the engagement speed of the centrifugal clutch, each pair of primary shoes 119 and secondary shoes 121 will, as a unit, move radially outwards against the effect of the springs 137 until the two friction members 123 come into contact with the inside of the clutch drum 139 and transfer torque. If the locking means 133 are now released, the primary shoes 119 will be able to move radially outwards as far as the stopping bosses such as shown at 79 in the species of FIGS. 4 and 5 of the clutch center 113 allow. However, during the outward movement, the guiding bosses 131 of each primary shoe 119 will come into contact with the slots 129 in the diametrically opposing secondary clutch shoe 121 at the slot end nearest the end of the shank, thereby pulling said secondary shoe 121 along with it during its outward movement. The result of this is that each primary shoe 119 will, during its outward movement, pull the opposing secondary shoe 121 radially inwards so that its engagement with the clutch drum will cease and total disengagement will take place. The position shown in FIG. 7 has, herewith, been achieved. From this position, the clutch can be returned to its starting position with the locking means in a locking position between the primary and secondary shoe by means of lowering the speed of the motor shaft.

A torsion spring 140 having its shanks connected to the secondary shoe shanks 125 is arranged on both sides of the shaft 111. The springs 140 attempt to pull the secondary shoes 121 in towards the center and prevent them from driving the drum at a speed which is only somewhat greater than the engagement speed of the centrifugal clutch, that is, before the speed is so high that the primary shoes, due to the progression of the draw springs 137, have been able to activate the opposite secondary shoe. During idling, the movement of the secondary shoes towards the center is restricted by the contact between the inner end of the secondary shoe's slot 129 and the guding boss 131 of the opposing primary shoe, whereby the locking means are allowed to take on the locking position.

FIGS. 8 and 9 show two further embodiments of the invention in a position of rest. The Figures are greatly schematic. Both of the embodiments have a clutch drum 141 and a clutch shoe center 145 attached onto a motor shaft 143; two primary clutch shoes 147 radially movable on said clutch shoe center 145. A locking means 149 holds a secondary shoe 151 at a distance from the primary shoe 147. According to FIG. 8, the primary shoes 147 are pulled towards each other by means of draw springs 153 and the secondary shoes are pulled towards each other by means of draw springs 155 which are attached in between the secondary shoes. According to FIG. 9, two draw springs 157 are stretched between each secondary shoe 151 and the opposing primary shoe 147. Thus, these springs have the double function of pulling both the secondary and primary shoes towards the center. However, according to both of the embodiments, the secondary shoes 151 will be pulled away from contact against the clutch drum 141 when the lock 149 is released. The springs 155 and 157 respectively, are so dimensioned in relation to the mass of the secondary shoes that they can always overcome the centrifugal force on the secondary shoes. The engagement speed of the centrifugal clutch is determined by the combined force of the springs in relation to the mass of all of the shoes.

In similarity to that which has been described above, the radial outward range of movement of the primary shoes is also restricted, preferably by means of the clutch center 145, in both of these constructions. Furthermore, the radial inward extent of movement of the secondary shoes is restricted, suitably also by the clutch center 145, for example by arms extending radially from said center, so that the locking means 149 shall be able to return to the locking position idling speed.

The invention is not restricted to the embodiments described above and shown in the drawings, but can be varied within the scope of the enclosed claims. Thus, for example, the secondary shoes can be constructed so that their center of gravity lies in the clutch center, whereby, at speeds slightly greater than the engagement speed of the centrifugal clutch and released locking means, they will not pull the drum. The center of gravity of the secondary shoes can, alternately, be arranged on the opposing side of the clutch center in relation to the friction member of the secondary shoe. During disengagement by means of release of the locking means, the secondary shoes will, themselves, be drawn away from the drum by centrifugal force. However, care must be taken, for example by means of springs, that the secondary shoes go apart so that the locking means can be returned to a locking position during idling. The releasing arrangement, for example, boss 57 according to FIG. 2, is preferably so dimensioned in relation to the clutch that, at a speed which is below the engagement speed of the centrifugal clutch, the locking means will not be affected. If the speed is increased while the releasing arrangement is still functioning, the locking means will be hit by the releasing arrangement, which is why the clutch drum remains disengaged independent of the speed. In the event that the secondary shoes and the locking means with them are drawn in during disengagement and high speeds (the embodiments according to FIGS. 4-9), the locking means will not be influenced by the releasing arrangement at these high speeds either. The same thing is obtained in the embodiment according to FIGS. 1-3 by means of the end 49 of the locking means 43 being maintained radially in front of the boss 51 during disengagement at high speeds. Thus, the locking means are influenced only temporarily in the moment of disengagement, whereby the locking means as well as the releasing arrangement is saved from wear.

What I claim is:

1. An arrangement for a centrifugal clutch comprising a clutch shoe center attached to a driving shaft, a clutch drum attached to a driven shaft, a clutch shoe assembly which under the effect of centrifugal force engages said clutch drum to provide a driving connection between said driving and driven shafts, said clutch shoe assembly comprising a radial inner primary shoe which is driven by said clutch shoe center and a radial outer secondary shoe which is radially movable in relation to said primary shoe, a spring for biasing said primary shoe inward so that outward movement of said primary shoe under the influence of centrifugal force is against the force of said spring, a stopping means connected to said clutch center, said primary shoe being movable from a radial inner release position to an outer position which is determined by said stopping means, a releasable locking means arranged between said primary shoe and said secondary shoe which, in a first position, permits operative contact of said secondary shoe with said primary shoe in a radial outer working position and in which said secondary shoe, under the influence of centrifugal force acting on said primary shoe presses against said clutch drum to transmit torque from said driving shaft to said driven shaft, means for actuating said locking means to a second position which releases said secondary shoe, in which position said secondary shoe are allowed to move mutually radially, the radial dimension of said secondary shoe being less than the distance between said primary shoe in its outer position and said clutch drum, said distance being measured at said secondary shoe, whereby, when said locking means and said secondary shoe are released, the centrifugal force acting on said primary shoe is taken up by said clutch center while said secondary shoe lies free from said clutch drum or is pressed against said drum by, at most, only the centrifugal force acting in said secondary shoe.

2. An arrangement according to claim 1, characterized in that the primary shoe has a central radial recess which is engaged by a radial driving arm of the clutch center, said arm and recess having interacting stopping means which prevent the primary shoe from moving outwards past said outer position.

3. An arrangement according to claim 1, characterized in that the locking means is journalled in the primary shoe.

4. An arrangement according to claim 3, characterized in that the locking means is pivotably mounted in a recess in the radial outer portion of the primary shoe and, in the locking position, is pivoted out into contact against a locking boss in the secondary shoe.

5. An arrangement according to claim 3, characterized in that the locking means in its release position, rests in a recess in the radial outer portion of the primary shoe and has an edge flange which, in the locking position, is situated between the secondary shoe and the primary shoe and rests against the outer circumference of the latter.

6. An arrangement according to claim 1, characterized in that the locking means is actuated by centrifugal force to take on a locking position.

7. An arrangement according to claim 1, characterized in that a spring is stretched between the primary shoe and the locking means for the purpose of bringing an unlocking means to a locking position.

8. An arrangement according to claim 1, characterized in that the secondary shoe is bow-shaped and is provided with axial pins situated at radially inwardly directed portions, said pins running in guiding slots in the primary shoe.

9. An arrangement according to claim 8, characterized in that the guiding slots are formed with such a contour that the secondary shoe, during its radial inward movement, also moves in the opposite direction to the direction of rotation in relation to the primary shoe.

10. An arrangement according to claim 1, characterized in that the primary shoe is coupled to a secondary shoe in such a way that the primary shoe, in its radial outward movement obtained by the release of the locking means to its release position and caused by centrifugal force, causes radial inward movement of the secondary shoe so that the secondary shoe ceases to engage with the clutch drum.

11. An arrangement according to claim 10, characterized by two diametrically opposite primary shoes and therewith interacting secondary shoes, said secondary shoes each comprising a bow-shaped friction member for interaction with the clutch drum and two mutually parallel shanks extending from their respective end of the friction member, said shanks running along the sides of the associated primary shoe, extending past the clutch shaft and also running along the sides of the opposite primary shoe, whereby the sides of the primary shoes each have a projecting guiding boss which projects into an elongated opening in the shank of the opposite secondary shoe, wherewith, when the clutch is engaged, the distance between the stopping edge of the guiding boss which is facing away from the friction member of the opposite secondary shoe and the end of the opening which is turned away from the friction member is less than the extent of movement of the primary shoe from said engagement position of the clutch to the outer end position of the primary shoe so that the guiding boss, during said movement of the primary shoe, comes into contact against the end of the opening and, subsequently, conveys the opposite secondary shoe away from engagement with the clutch drum.

12. An arrangement according to claim 11, characterized in that the guiding bosses of a primary shoe also engage in guiding slots in the shanks of the secondary shoe interacting with the primary shoe for laterally guiding the secondary shoe and to draw in the latter at rotational speeds below the engagement speed of the centrifugal clutch.

13. An arrangement according to claim 11, characterized in that at least one of the guiding bosses in each primary shoe comprises a screw which is screwed into the primary shoe.

14. An arrangement according to claim 11, characterized by drawspring means acting between the opposing secondary shoes and drawing the shoes radially inwards, said drawspring means being a torsion spring attached between the shanks of the secondary shoes on both sides of the shaft.

15. An arrangement according to claim 10, characterized in that the two ends of a line are attached to the primary shoe, said line extending around a pair of pin members which are situated each on one side of the drive shaft and mounted on the clutch center, the middle portion of said line being suitably connected to the secondary shoe and the length of the line being so selected that when the primary shoe is in its outer end position, said primary shoe has, by means of the line, drawn the secondary shoe out of engagement with the clutch drum.

16. An arrangement according to claim 1, characterized in that drawspring means draw the secondary shoe out of engagement with the clutch drum when locking means are released to a release position.

17. An arrangement according to claim 16 having two opposing pairs of primary and secondary shoes, characterized in that the drawsprings are stretched between the opposing secondary shoes.

18. An arrangement according to claim 16 having two opposing pairs of primary and secondary shoes, characterized in that the drawsprings are stretched between each secondary shoe and opposing primary shoe respectively.

19. An arrangement according to claim 1, characterized in that the locking means project axially outside of the outer contour of the clutch and, from its locking position, can be actuated radially inwards to its release position by means of releasing means which can be conveyed radially into the path of movement of the locking means.

20. An arrangement according to claim 1, characterized in that the secondary shoes have less mass than the primary shoes.

21. An arrangement according to claim 1, characterized in that the locking means has a member projecting outside of the outer contour of the centrifugal clutch, said member being actuated by means of an arbitrarily manoeuverable releasing means for bringing the locking means to a shoe releasing position.

* * * * *